March 19, 1963     F. A. BUUCK     3,082,374

AUTOMATIC TESTING SYSTEM AND TIMING DEVICE THEREFOR

Filed June 12, 1959     6 Sheets-Sheet 1

INVENTOR.
FREDERICK A. BUUCK

BY *Gust & Irish*

ATTORNEYS

March 19, 1963     F. A. BUUCK     3,082,374
AUTOMATIC TESTING SYSTEM AND TIMING DEVICE THEREFOR
Filed June 12, 1959     6 Sheets-Sheet 6

INVENTOR.
FREDERICK A. BUUCK
BY Gust & Irish
ATTORNEYS

United States Patent Office 3,082,374
Patented Mar. 19, 1963

3,082,374
AUTOMATIC TESTING SYSTEM AND TIMING DEVICE THEREFOR
Frederick A. Buuck, Fort Wayne, Ind., assignor to International Telephone and Telegraph Corporation
Filed June 12, 1959, Ser. No. 819,973
10 Claims. (Cl. 324—73)

This invention relates generally to systems for automatically testing complex apparatus, such as a guided missile, and more particularly to a timing device for such a testing system.

In order to test a complex piece of equipment which is capable of performing a number of functions in response to external commands and/or self-sensed local conditions, such as for example, a guided missile, it is necessary to apply to the equipment being tested an input stimulus or signal simulating a command or condition which the equipment would receive in operation and to measure and evaluate the response of the equipment to such stimulus; since there will frequently be a time delay between application of the stimulus on the one hand and the response of the equipment thereto on the other hand, it may further be necessary to time the evaluation function to occur at a predetermined time following application of the stimulus. In the case of extremely complex equipment, such as a guided missile, it is readily apparent that in order completely to test the equipment, many stimuli of different types and characteristics must be applied and the responses thereto respectively evaluated, and it will also be readily apparent that the requisite time delay between application of the stimulus and evaluation of the response thereto may vary widely, depending upon the particular stimulus being applied. There may also be instances in which it is necessary to apply a succession or train of stimuli with the response of the equipment to such train being evaluated, and it may also be necessary in certain instances to initiate an evaluating operation sometime prior to the final evaluation determination.

In the case of the testing of complex apparatus, if each required test were to be manually conducted, the time required for complete testing of the equipment could be prohibitive. It is therefore highly desirable to provide a system for automatically testing complex equipment and it will be readily comprehended that a major element of any such automatic testing system is the timing device which synchronizes application of the stimulus to the equipment being tested, and enables or actuates the evaluator device, after an appropriate time interval. It will be readily seen that such a timing device must be extremely flexible, supply precise time delays and evaluation periods, and incorporate a simple method of time interval selection.

In the particular case of an automatic testing system for a guided missile, it was necessary for the timing device to supply three types of timing information simultaneously over a wide range of period durations with accuracies of less than 2% of its shortest time interval, it was necessary that the device be capable of repeating any given timing function instantaneously upon completion of the same function, and it was also necessary that the device be impervious to transients created by any portion of the system and that it be capable of performing a check upon itself to determine whether its functions were properly operating and coordinated.

The foregoing requirements were found to preclude the use of conventional timing devices and methods such as thermal time delay relays, pre-set mechanical timers, magnetic or punched tape systems or electronic oscillator circuits. I have found, however, that an automatic testing system satisfying the foregoing requirements can be provided by employing ten stable state instantaneous resetting pulse counting devices as the basic timing element; the most common type of such ten stable state device is a glow transfer tube.

My invention, in its broader aspects, therefore, provides an automatic testing system having stimulus generator means for connection to the apparatus being tested for supplying a predetermined test stimulus thereto responsive to a synchronizing signal and evaluator means for connection to the apparatus for evaluating the response thereof to the stimulus responsive to an enabling signal. The improved timing system of my invention supplies both the synchronizing and enabling signals with a predetermined time interval therebetween and comprises a source of electrical input pulses having a predetermined repetition frequency and a plurality of successively higher order ten stable state instantaneous resetting pulse counting devices coupled in cascade, these counting devices thus counting down the input pulses. The timing system is provided with a first output circuit means coupled to the stimulus generator means and to the pulse source for providing the synchronizing pulses and second output circuit means coupled to the evaluator means and to preselected pick-off circuits of the counting devices for providing an enabling pulse responsive to the count indicated by the pick-off circuit. Means are further provided coupling the second output circuit of the timing system and all of the counting devices for terminating the pulse counting thereby, and for resetting all of the devices to zero responsive to an enabling pulse.

It is accordingly an object of my invention to provide an improved automatic testing system.

Another object of my invention is to provide an improved automatic testing system incorporating ten stable state instantaneous resetting pulse counting devices as the timing elements.

A further object of my invention is to provide an improved timing system for automatic testing apparatus incorporating ten stable state glow transfer tubes as the timing elements.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
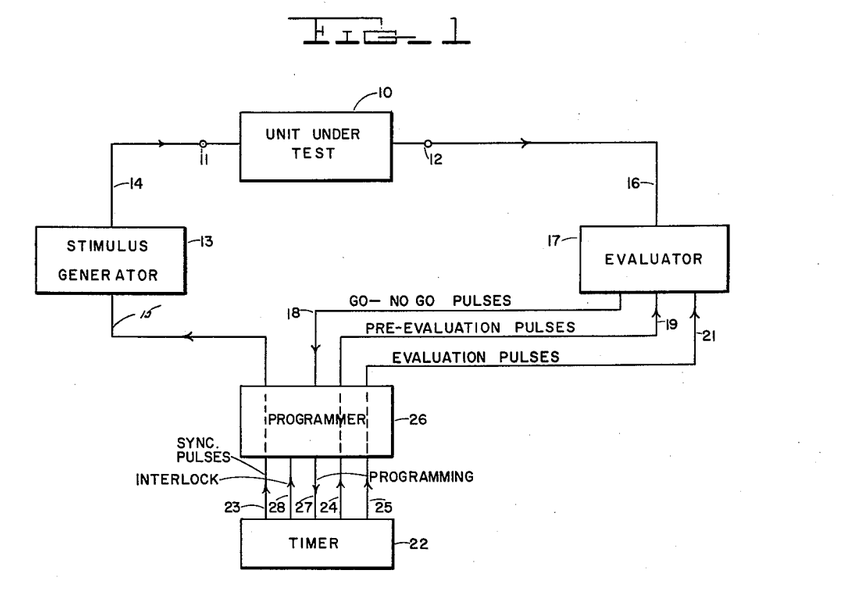
FIG. 1 is a block diagram schematically illustrating the improved automatic testing system of my invention.

Referring now to FIG. 1 of the drawing, the unit being tested, which as indicated may be a guided missile, is shown at 10. The test unit 10 may have a stimulus input terminal 11 and a response output terminal 12, it being understood that complex apparatus such as a guided missile may have several hundred such stimulus input and response output terminals. A stimulus generator 13 is shown having its output circuit 14 connected to stimulus input terminal 11 of test unit 10 for supplying the requisite stimulus signal thereto. It will be readily understood that stimulus generator 13 may be any device applying an electrical, mechanical, or fluid stimulus to the test unit, and thus, stimulus generator 13 may, for example, take such forms as a conventional signal generator providing an alternating current or pulsed signal of predetermined frequency and amplitude, a direct current power supply providing a direct current signal having a predetermined level, or a servotransmitter. The stimulus generator 13 in turn has a synchronizing or trigger input circuit 15 for receipt of appropriate synchronizing or triggering signals which serve to actuate, gate-on, or trigger the stimulus generator 13 to provide the requisite stimulus signal in output circuit 14. Thus, in a specific instance, the stimulus generator 13 may be a gated signal generator with input circuit 15 providing a gating signal thereto for turning the signal generator on and off responsive to a gating or synchronizing signal.

Output terminal 12 of test unit 10 is in turn coupled to input circuit 16 of evaluator device 17. Here, evaluator 17 is any type of response measuring apparatus appropriate to the character of the stimulus being impressed on the test unit 10 which provides a "go" or "no-go" indication in its output circuit 18 indicating respectively that the response of the test unit 10 for the particular impressed stimulus is, or is not, within predetermined limits. Thus, in the particular case of the application of direct current or low frequency alternating current stimuli to test unit 10, evaluator 17 may be of the type illustrated and described in co-pending application Serial Number 795,824, now Patent No. 3,039,024, of David L. Spooner, filed February 26, 1959, and assigned to the assignee of the present application. Evaluator 17, when of the type shown and described in the aforesaid Spooner application, includes a pre-evaluation enabling signal input circuit 19 and an evaluation enabling or read out signal input circuit 21.

In order suitably to synchronize the application of the requisite stimulus to the test unit 10 by the stimulus generator 13 on the one hand and to enable evaluator 17 at an appropriate time thereafter on the other hand, a timing device 22, to be hereinafter more fully described, is provided. Timing device 22 has a first output circuit 23 for providing the requisite synchronizing or triggering signals to the stimulus generator 13, a second output circuit 24 for providing the requisite pre-evaluation signal to the input circuit 19 of evaluator 17, and a third output circuit 25 for providing the requisite evaluation or enabling signals to evaluator 17.

In order to provide an automatic testing system capable of successively applying different stimuli to test unit 10 and evaluating the response thereto, a programming device 26 is provided which may take any conventional form, such as a punch-tape actuated programmer. Programmer 26 thus for each programmed test, connects output circuit 23 of timer 22 to stimulus generator 13, and connects output circuits 24 and 25 of timer 22 to evaluator 17. Likewise, the readout output circuit 18 of evaluator 17 is coupled to the programmer 26, a "go" output signal from evaluator 17 causing programmer 26 to advance to the next programmed test, and a "no-go" signal from evaluator 17 resulting in stopping of programmer 26, as is well known in the art. Programmer 26 thus is coupled to timer 22, as indicated at 27, and, as will be hereinafter described, sets up the appropriate timing intervals of timer 22 for the test to be conducted. In addition, as will be further described hereinafter, in the preferred embodiment of my invention, an interlock connection 28 is provided between timer 22 and the programmer 26.

The general requirements of the timing device 22 of FIG. 1 are (1) to provide either a predetermined number or a continuous train of synchronizing trigger pulses having a predetermined pulse repetition frequency to the stimulus generator 13, (2) to provide a pre-evaluation potential to the evaluator 17 at the conclusion of a predetermined period of time which is less than the evaluation period or delay, and (3) to provide an evaluation or enabling potential to the evaluator 17 at the conclusion of a predetermined period of time. In the specific embodiment of my invention to be hereinafter described, the specific functional requirements were as follows:

| Sync Trigger | Pre-Evaluation Delay, seconds | Evaluation Delay |
|---|---|---|
| 1 pulse | 1.8 | Selectively variable between 1 second and 999 seconds in .1 second intervals. |
| 2 pulses | 2.8 | |
| 6 pulses | 5.8 | |
| Continuous pulses | 15 | |
| PRF selectively variable between .1 and 1 second. | | |

Figure 2:
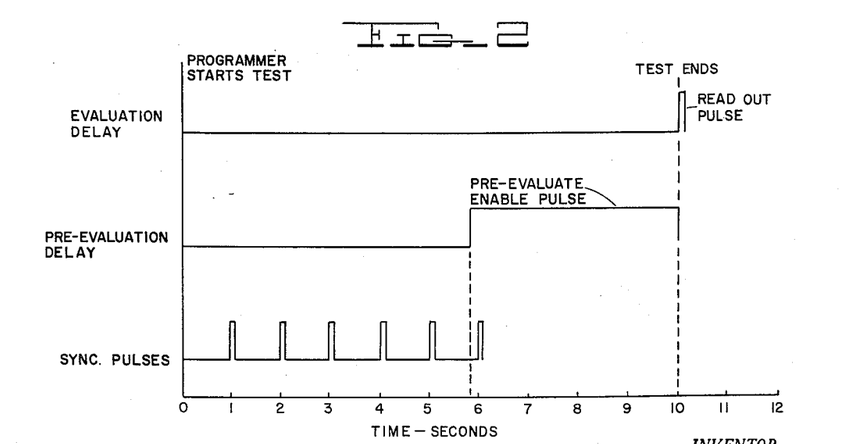
FIG. 2 is a chart illustrating three specific timing functions which may be provided by the system of FIG. 1.

Referring now briefly to FIG. 2, there is shown in chart form one specific timing operation provided by timing device 22 in which six sync trigger pulses having a PRF of one second are provided, a pre-evaluation enabling pulse or signal is provided after a 5.8 second delay, following initiation of the test by the programmer 26, and an evaluation or read-out pulse is provided after a ten second delay following initiation of the test.

Figure 3:
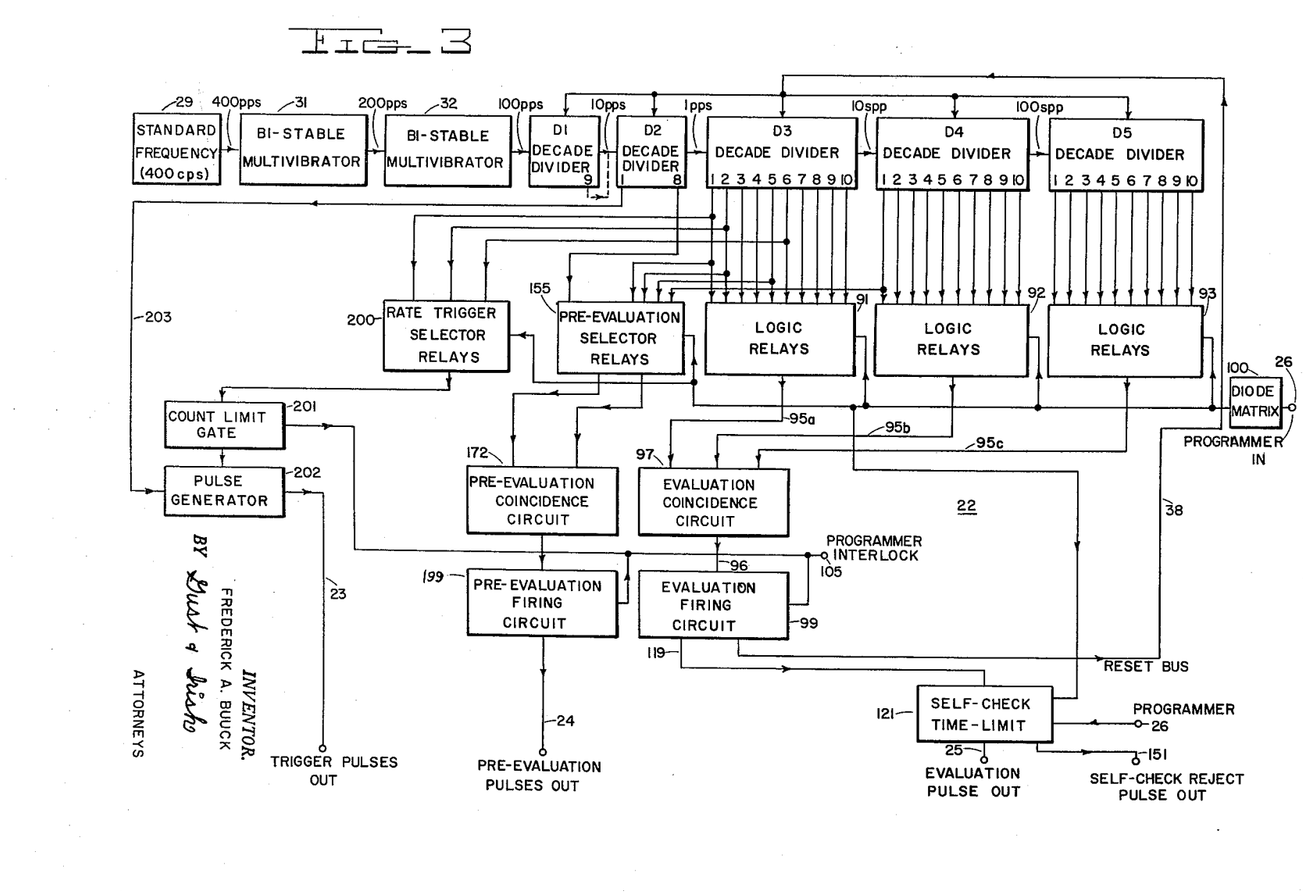
FIG. 3 is a block diagram schematically showing further details of the timing system of FIG. 1.

Referring now to FIG. 3 of the drawing, which schematically illustrates timing device 22 of my invention, a 400 cycle alternating current source 29, which may be a conventional 400 cycle tuning fork oscillator, is employed as the time base of the system. Four hundred cycle source 29 in turn feeds a pair of conventional bi-stable multivibrators 31 and 32 so that the 400 cycle per second alternating current provided by source 29 is reduced or divided to 100 pulses per second at the output of bi-stable multivibrator 32. The 100 pulse per second output of bi-stable multivibrator 32 is then fed to a decade divider counting chain formed of cascade connected ten stable state glow transfer tubes D1, D2, D3, D4 and D5. It will be recognized that each of the decade dividers D1 through D5 forms a successively higher order pulse counting element, and thus by means of the decade divider chain of five glow transfer tubes, the 100 pulse per second output of the bi-stable multivibrator 32 is reduced or divided to a maximum of 999.99 seconds per pulse at the last pulse count pick-off element of decade divider D5.

Figure 4:
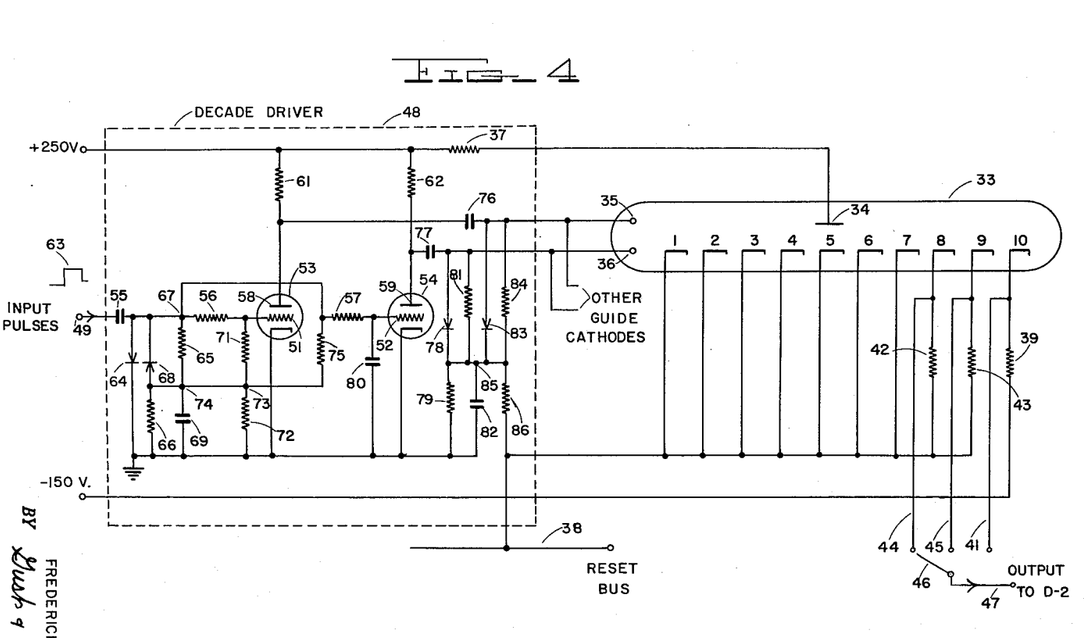
FIG. 4 is a fragmentary schematic diagram showing one of the decade dividers of the system of FIG. 3.

Referring now additionally to FIG. 4, the specific circuitry of glow tube divider D1 and the general circuitry of the remaining glow tube dividers D2 through D5, is shown. Here, the glow transfer tube is schematically shown at 33, type 6476 glow transfer tube being suitable for use in all of the dividers D1 through D5. Glow transfer tube 33 comprises an anode 34, ten main cathodes identified by the numerals 1 through 10, with a pair of guide cathodes interposed between each main cathode; one pair of such guide cathodes 35 and 36 are shown in tube 33 of FIG. 4, it being readily understood that there are ten such pairs provided respectively connected in parallel. The mode of operation of a ten stable state glow transfer tube is well understood in the art and need not be restated here. It will be observed that the anode 34 is connected to a suitable source of anode potential, such as +250 volts, by an anode resistor 37, and that in the specific case of the glow tube divider D1, main cathodes 1 through 7 are directly connected to reset bus 38 which normally is connected to a suitable source of negative potential, such as −150 volts, but which, as will be hereinafter more fully described, is at times connected to a higher potential, such as ground, in order to terminate counting of the tube 33 and to reset the same to zero.

If glow transfer tube divider D1 were only required to divide the input pulses by ten, i.e., from 100 pulses per second (PPS) to ten pulses per second, it would merely be necessary to provide one cathode resistor 39 connected to main cathode number 10 with a pick-off circuit 41 being connected to main cathode number 10. Thus, a count indicating pulse would appear on resistor 39 in response to the tenth input pulse applied to the guide cathodes 35 and 36, assuming, of course, that the tube had been reset to zero so that the first glow transfer was from the number ten to the number one main cathode. In the present instance, however, it may be desirable to compensate for inherent time delays in the system, and thus, cathode resistors 42 and 43 are also provided connected respectively to main cathodes 8 and 9 with pulse pick-off circuits 44 and 45 also being respectively connected to main cathodes 8 and 9, and with a selector switch 46 then being provided in order selectively to connect output circuit 47 to the pulse pick-off circuits 41, 44 and 45. Inherent time delay in the overall system itself is a fixed interval which may be on the order of forty to sixty milliseconds. Thus, by proper selection of the output cathode in the decade divider D1, maximum accumulated error can be substantially reduced.

It will be observed that cathode resistors 42 and 43 are, in common with cathodes, numbers 1 through 7, directly connected to the reset bus 38, whereas cathode resistor 39 of main cathode 10 is directly connected to a −150 volt supply. Thus, it will be readily comprehended that when the reset bus 38 is grounded, the anode-to-cathode glow of glow transfer tube 33 is immediately shifted to main cathode 10, and counting by the tube is effectively terminated so long as the reset bus 38 is maintained at ground potential. However, when reset bus 38 is again connected to −150 volts, counting will again start from zero, and it is thus seen that grounding the reset bus 38 results not only in termination of the counting operation of the glow transfer tube 33, but also in resetting of the count to zero.

Glow transfer tube 33 of decade divider D1 and the glow transfer tubes of the other decade divider stages D2 through D5 are driven by identical driver stages 48. Here, an input terminal 49 is provided connected in the case of decade divider D1 to the output circuit of bi-stable multivibrator 32. Input terminal 49 is coupled to control grids 51 and 52 of driver tubes 53 and 54 by coupling capacitor 55 and grid resistors 56 and 57, as shown. Plates 58 and 59 of tubes 53 and 54 are connected to the +250 volt source of plate potential by plate resistors 61 and 62. The 100 pulses per second input pulses 63 impressed on input terminal 49 of driver 48 are differentiated by capacitor 55 and diode 64 connected to ground as shown. A voltage divider formed of resistors 65 and 66 is connected between point 67 intermediate capacitor 55 and resistor 56 on the one hand and ground, with diode 68 being connected in parallel with resistor 65 and capacitor 69 being connected in parallel with resistor 66 as shown. Another voltage divider formed of resistors 71 and 72 is connected between control grid 51 of tube 53 and the negative 150 volt source with midpoint 73 between resistors 71 and 72 being directly connected to midpoint 74 between resistor 65 and capacitor 69. Another resistor 75 is connected between midpoint 73 and point 67 between resistors 56 and 57 as shown. The cathodes of tubes 53 and 54 are directly connected to ground as shown. Capacitor 80 connects grid 52 of tube 54 to ground as shown.

The capacitor 76 connects plate 58 of tube 53 to guide cathodes 35 while another capacitor 77 connects plate 59 of tube 54 to guide cathodes 36, as shown. A diode 78 and resistor 79 connect guide cathodes 36 to ground, with a resistor 81 being connected across diode 78, and a capacitor 82 being connected across resistor 79. Another diode 83 and resistor 84 are connected in parallel between guide cathodes 35 and midpoint 85 between resistor 81 and capacitor 82. Another resistor 86 connects midpoint 85 to the reset bus 38, as shown. Capacitor 77, resistor 81 and diode 78 form a time constant and clipping circuit for the differentiated negative-going pulses appearing across plate resistor 62 whereas capacitor 76, resistor 84 and diode 83 form another clipping and time constant circuit for the negative-going pulses appearing across plate resistor 61 so that the negative-going pulses appearing on guide cathode 36 are time delayed with respect to the negative-going pulses appearing on guide cathode 35. In a specific timing device constructed in accordance with my invention, driver stage 48 had the following component values:

| | | |
|---|---|---|
| Resistor 37 | ohms | 430,000 |
| Resistor 39 | do | 62,000 |
| Resistor 42 | do | 62,000 |
| Resistor 43 | do | 62,000 |
| Tubes 53, 54 | | 12AV7 |
| Capacitor 55 | microfarad | .01 |
| Resistor 56 | ohms | 100,000 |
| Resistor 57 | do | 100,000 |
| Resistor 61 | do | 27,000 |
| Resistor 62 | do | 27,000 |
| Resistor 65 | do | 100,000 |
| Resistor 66 | do | 12,000 |
| Capacitor 69 | microfarad | .47 |
| Resistor 71 | ohms | 200,000 |
| Resistor 72 | do | 130,000 |
| Resistor 75 | do | 100,000 |
| Capacitor 76 | microfarad | .0022 |
| Capacitor 77 | do | .0047 |
| Resistor 79 | ohms | 120,000 |
| Capacitor 80 | microfarad | .001 |
| Resistor 81 | ohms | 330,000 |
| Capacitor 82 | microfarad | .47 |
| Resistor 84 | ohms | 330,000 |
| Resistor 86 | do | 30,000 |

Referring back to FIG. 3, decade divider D2 is virtually identical to decade divider D1 incorporating an identical driver stage 48, however, in the specific embodiment illustrated, pulses pick-off resistors are provided connected to cathodes numbers 1, 8 and 10 of the glow transfer tube of decade divider D2, for a reason to be hereinafter described.

Figure 5:
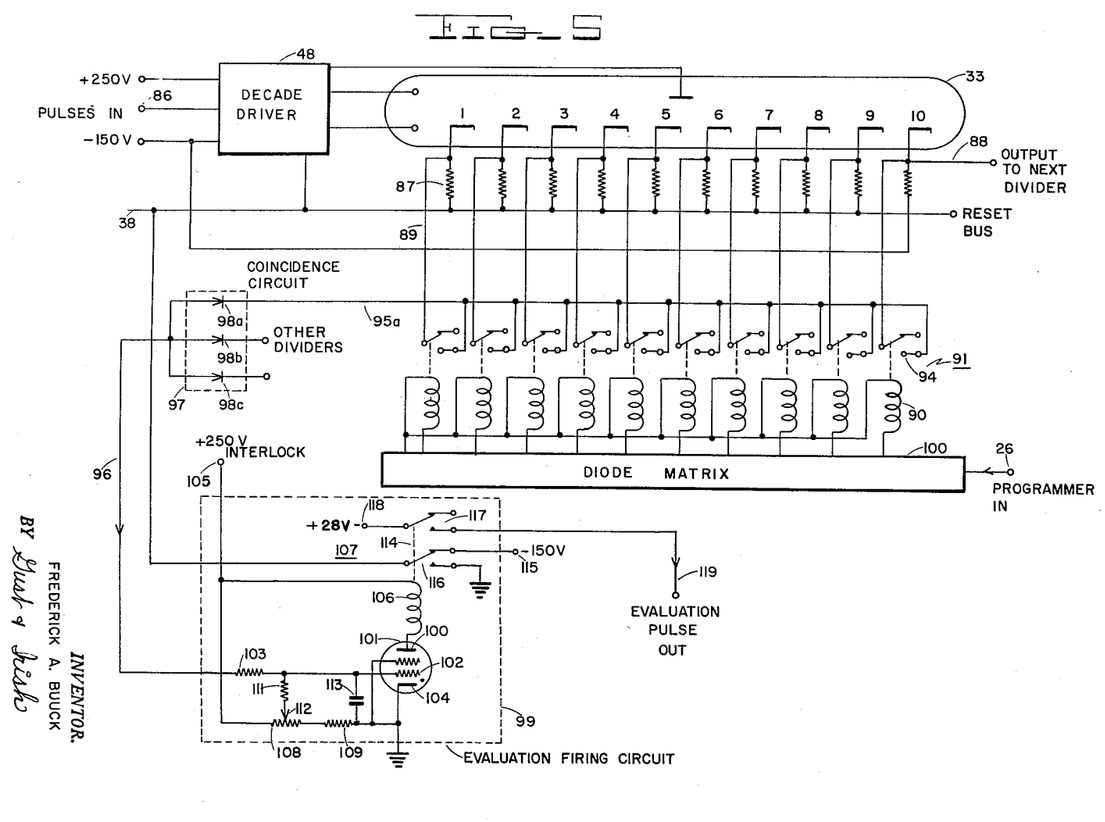
FIG. 5 is a fragmentary schematic diagram showing another of the decade dividers and the associated logic relay and output circuitry of the system of FIG. 3.

Referring now additionally to FIG. 5, the specific circuitry of decade divider D3 will be described. Here, glow transfer tube 33 is again driven by a driver stage 48 having its input circuit 86 coupled to the pulse pick-off circuit of the number 10 cathode of decade divider D2. Here, however, pulse pick-off resistors 87 connect each of the main cathodes numbers 1 through 9 to the reset bus 38 with the last pulse pick-off resistor again connecting main cathode 10 to the negative 150 volt source. As in the case of the other glow transfer tube divider stages, output circuit 88 is connected to the number 10 main cathode.

Here, it is seen that pulse count indicating circuits 89 are connected to each of the main cathodes numbers 1 through 10 of tube 33 of decade divider D3, and likewise, ten pulse-count indicating circuits are brought out from the ten main cathodes of each of the decade dividers D4 and D5. Selector or logic relay groups 91, 92 and 93 are provided respectively connected to the pulse count indicating pick-off circuits 89 of decade dividers D3, D4 and D5; logic relays 92 and 93 are identical with logic relays 91 being shown in FIG. 5. Here, each of the ten logic relays forming group 91 has its operating coil 90 connected for selective energization by switching means 100, which may be a diode matrix, the selection of the desired relay operating coil to be energized in each group of logic relays 91, 92 and 93 being made by programmer 26 coupled to the diode matrix 93, as is well known to those skilled in the art. Each of the ten logic relays of group 91 (and also groups 92 and 93), is provided with normally open contacts 94 connected between a respective pulse count indicating pick-off circuit 89 and output circuit 95. It is thus seen that when the operating coil 90 of any one of the logic relays 91 is energized through diode matrix 100, its contacts 94 are closed thus connecting the respective pulse-count indicating pick-off circuit 89 to the output circuit 95(a) so that the count indicating pulse which appears across the respective pick-off resistor 87 will in turn appear in the output circuit 95(a). Output circuits 95(a), 95(b) and 95(c) from logic relays 91, 92 and 93 are connected to a common output circuit 96 by coincidence circuit 97 formed of diodes 98(a), 98(b) and 98(c), as is well known in the art.

It will now be seen that a timing pulse is provided in output circuit 96 at a time interval following beginning of the counting-down operation, dependent upon the particular selection of logic relays 91, 92 and 93 made by programmer 26. Thus, upon energization of any one logic relay in any one of the groups 91, 92 and 93, a corresponding diode 98(a), 98(b) or 98(c) as the case may be, is connected to the respective pulse pick-off circuit 89. For example, if relay coil 90 of logic relay group 91 associated with cathode 1 of glow transfer tube 33 of decade divider D3 is energized, a pulse will be fed to output circuit 96 at the end of one second. It will now be readily understood that the coincidence circuit 97 is employed to obtain timing interval periods which are not a direct pick-off from one of the decade dividers D3, D4 and D5. For example, for a timing interval of 265 seconds, the relay of logic relay group 91 associated with cathode 5 of tube 33 of decade divider D3 will be actuated, together with the relay of logic relay group 92 associated with cathode 6 of the glow transfer tube of divider D4 and the relay of group 93 associated with cathode 2 of the glow transfer tube 33 of decade divider D5. The following chart indicates the cathodes and thus in turn the pulse count indicating pick-off circuits and logic relays which will be actuated for a representative selection of evaluation delays running from one to nine hundred seconds.

| Evaluation Delay (seconds) | D5 Cathode Pick-off | D4 Cathode Pick-off | D3 Cathode Pick-off |
|---|---|---|---|
| 1 | | | 1 |
| 2 | | | 2 |
| 3 | | | 3 |
| 4 | | | 4 |
| 5 | | | 5 |
| 6 | | | 6 |
| 8 | | | 8 |
| 10 | | 1 | |
| 16 | | 1 | 6 |
| 20 | | 2 | |
| 25 | | 2 | 5 |
| 40 | | 4 | |
| 50 | | 5 | |
| 60 | | 6 | |
| 80 | | 8 | |
| 90 | | 9 | |
| 120 | 1 | 2 | |
| 265 | 2 | 6 | 5 |
| 900 | 9 | | |

Output circuit 96 of evaluation coincidence circuit 97 is connected to firing circuit 99. Firing circuit 99 which provides an evaluation-enabling or read-out pulse to the evaluator 17 includes a thyratron-type tube 101 having its control grid 102 connected to output circuit 96 of coincidence circuit 97 by a resistor 103, with cathode 104 of thyratron 101 being connected to ground as shown. Plate 100 of thyratron 101 is connected to positive 250 volt source of potential 105 through the operating coil 106 of relay 107. Positive 250 volt source of potential 105 is connected to an interlock (not shown) in programmer 26, as will be hereinafter more fully described. A voltage divider consisting of potentiometer 108 and resistor 109 connects the positive 250 volt interlock source 105 to ground, as shown, with a resisotr 111 connecting control grid 102 of thyratron 101 to the sliding element 112 of potentiometer 108. A capacitor 113 also connects control grid 102 of thyratron 101 to ground as shown.

Relay 107 is provided with a normally closed contact 114 connecting the reset bus 38 to the −150 volt source of potential 115 and a normally open contact 116 connecting the reset bus 38 to ground, as shown. Relay 107 also has a normally open contact 117 connecting a suitable source of control potential, such as +28 volts 118 to evaluation pulse output circuit 119, as shown.

It will now be readily comprehended that the pulse-count indicating pulses appearing on the pulse pick-off resistors 87 of glow transfer tubes 33 of decade dividers D3, D4 and D5 are positive-going in polarity, and thus that the timing pulse appearing in output circuit 96 from coincidence circuit 97 is likewise positive going; the presence of an output pulse in output circuit 96 thus drives control grid 97 of thyratron tube 101 positive, thus causing the tube to fire so that the plate current flowing in operating coil 106 of relay 107 causes the relay to pick-up. Picking up of relay 107 responsive to firing of thyratron 101 opens normally closed contact 114 thus removing the −150 volt potential from the reset bus 38 and closes normally open contact 116, thus grounding reset bus 38. As indicated hereinabove, grounding of reset bus 38, and thus grounding of all of the main cathode numbers 1 through 9 of each of the glow transfer tubes 33 of all of the decade dividers D1 through D5, immediately causes the anode-to-cathode glow of each tube to shift to cathode number 10 of each tube, thus effectively terminating the counting operation and resetting each of the tubes to zero count. Picking-up of relay 107 also closes normally open contact 117 thus applying the positive 28 volt potential to the evaluation pulse output circuit 119 thus providing a 28 volt enabling pulse to the evaluator 17.

It is well known that a gas tube, such as a thyratron-type tube, once it has fired, will remain conductive until the plate potential is removed. Thus, once tube 101 has fired responsive to a timing interval pulse appearing in circuit 96, relay 107 will remain picked-up until the positive 250 volt source of potential 105 applied to plate 100 is removed. Thus, with normally open contact 116 closed so that the cathode numbers 1 through 9 of each of the tubes 33 of decade dividers D1 through D5 are grounded, all counting is terminated. Positive 250 volt interlock terminal 105 is thus connected to interlock contacts in programmer 26 so that if a "go" signal is provided to the programmer 26 from evaluator 17, so that the programmer in turn advances to program the next test, the interlock contacts are at that time momentarily opened, thus removing the 250 volt potential from the plate 100 of gas tube 101 thus deenergizing operating coil 106 of relay 107 so that contact 114 again closes, applying the −150 volt potential to the cathodes numbers 1 through 9 of the glow transfer tubes 33 of decade dividers D1 through D5, thereby initiating a new count-down, i.e., a new timing interval.

The values of the circuit components employed in an actual firing circuit 99 are shown below:

| | |
|---|---|
| Diodes 98(a), (b) and (c) | 1N463 |
| Tube 101 | 2D21 |
| Resistor 103 _________________ megohms | 1.3 |
| Potentiometer 108 _________________ ohms | 50,000 |
| Resistor 109 _________________ do | 200,000 |
| Resistor 111 _________________ megohms | 2.4 |
| Capacitor 113 _________________ microfarad | .1 |

Figure 6:
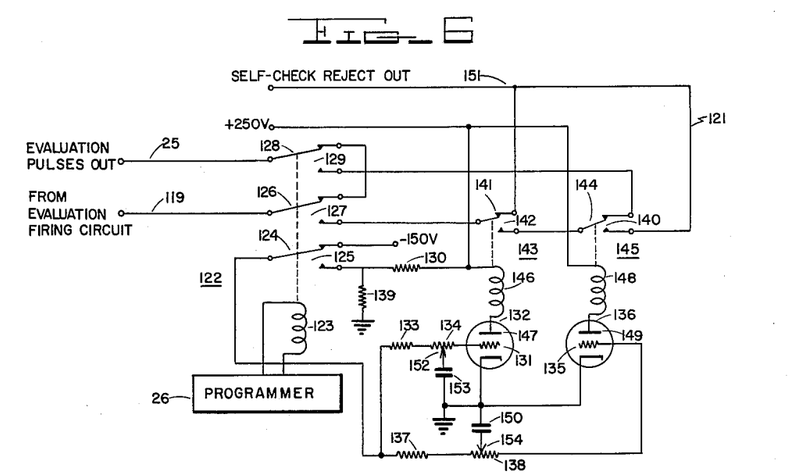
FIG. 6 is a fragmentary schematic diagram showing the self-check circuitry of the system of FIG. 3.

In order to provide a self-check of the system to determine whether the standard frequency source 29, the bistable multivibrators 31 and 32, and the decade dividers D1 through D5 are functioning properly, self-check time limit circuit 121 is provided. In the self-check circuit 121, a one pulse per second pulse called up by selector relays 91, 92 and 93 (main cathode number 1 of divider D3, and main cathodes number 10 of dividers D4 and D5), is compared with lower and upper tolerance limits selected by time constant circuits in the self-check circuit 121. More particularly, self-check circuit 121 comprises a relay 122 having an operating coil 123 connected for energization by programmer 26. Relay 122 includes normally closed and normally open contacts 124 and 125, 126 and 127, and 128 and 129. The common terminal of contacts 124, 125 is connected to control grid 131 of triode 132 by resistor 133 and potentiometer 134 and to control grid 135 of triode 136 by resistor 137 and potentiometer 138. Normally closed contact 124 is connected to the —150 volt source of potential and normally open contact 125 is connected to the positive 250 volt source of potential by resistor 130 and to ground by resistor 139. The common terminal of contacts 126, 127 is connected to the output circuit 119 of the evaluation firing circuit 99 with normally closed contact 126 being connected to normally closed contact 128 and normally open contact 127 being connected to the common terminal of contacts 141, 142 of relay 143. The common terminal of contacts 128, 129 is connected to the evaluation pulse output circuit 25 with normally open contact 129 being connected to normally closed contact 144 of relay 145. Operating coil 146 of relay 143 serially connects plate 147 of tube 132 to the positive 250 volt source, and likewise operating coil 148 of relay 145 serially connects plate 149 of tube 136 to the positive 250 volt source. Normally closed contact 141 of relay 143 and normally open contact 140 of relay 145 are connected to self-check reject-indicating output circuit 151 and normally open contact 142 of relay 143 is connected to the common terminal of contacts 144, 140 of relay 145.

Sliding contact 152 of potentiometer 134 is connected to ground by capacitor 153 with the cathodes of tubes 132 and 136 likewise being connected to ground, and with sliding contact 154 of potentiometer 138 being connected to ground by capacitor 150, as shown.

It will now be seen that when the programmer 26 has not energized operating coil 123 of relay 122, contacts 126 and 128 are closed, thereby directly connecting the evaluation pulse output circuit 119 from evaluation firing circuit 99 to the evaluation pulse output circuit 25, thereby supplying the timing pulse provided from evaluation firing circuit 99 responsive to a particular count-indicating pulse selection made by logic relays 91, 92 and 93, directly to evaluator 17. It will also be seen that when relay 122 is not actuated, normally closed contact 124 effectively connects grids 131 and 135 of triodes 132 and 136 to the —150 volt source of potential, thereby effectively cutting off these tubes. However, when relay 122 is actuated responsive to a command from programmer 26, circuit 119 from the evaluation firing circuit 99 is connected by normally open contact 127 to contacts 141, 142 of relay 143, and output circuit 25 is connected by normally open contact 129 to normally closed contact 144. In addition, with contact 125 closed, the —150 volt potential previously applied to grid 131 and 135 of tubes 132 and 136 is now removed, and the grids are now essentially connected to the positive 250 volt source through the voltage dividers formed of resistors 130, 133, 134 and 137, 138. It will now be observed that potentiometer 134 and capacitor 153 on the one hand and potentiometer 138 and capacitor 150 on the other hand respectively form timing circuits, and in the instant embodiment, the timing circuit formed by potentiometer 134 and capacitor 153 is adjusted to provide a .9 second time delay in conduction of tube 132 and thus actuation of relay 143, whereas the timing circuit formed by the potentiometer 138 and capacitor 150 is adjusted to provide a 1.1 second time delay in conduction of tube 136 and thus actuation of relay 145. It will now be seen therefore that if the output pulse from evaluation firing circuit 99 occurs prior to .9 seconds, contact 141 will still be closed and thus the output pulse will be fed to self-check reject circuit 151. On the other hand, if the output pulse from evaluation firing circuit 99 occurs after .9 seconds but before 1.1 seconds, the output pulse will find contact 142 closed, with contact 144 still closed, and thus the output pulse will be fed through contact 129 to the evaluation pulse output circuit 25. However, if the output pulse occurs after 1.1 seconds, contact 140 will now be closed and the output pulse again will be fed to the self-check reject circuit 151.

Component values used in an actual circuit in accordance with FIG. 6 are shown below:

| | | |
|---|---|---|
| Resistor 130 | ohms | 82,000 |
| Tubes 132, 136 | | 6201 |
| Resistor 133 | ohms | 560,000 |
| Potentiometer 134 | do | 500,000 |
| Resistor 137 | megohm | 1 |
| Potentiometer 138 | ohms | 500,000 |
| Resistor 139 | do | 56,000 |
| Capacitor 150 | microfarad | 1 |
| Capacitor 153 | do | 1 |

It will be observed that in the particular embodiment being described, it is desired to provide evaluation enabling pulses with a selectively variable delay between one second and 999 seconds, thus necessitating the employment of logic relays 91, 92 and 93. However, in the specific embodiment, only four pre-evaluation delays were required, and thus it is not necessary to employ logic relays for selecting the pre-evaluation delays, but merely necessary to utilize the selector relays identified at 155 in FIG. 3, and shown in detail in FIG. 7. Here, with four pre-evaluation time delays being specified, i.e., 1.8, 2.8, 5.8 and 15 seconds, four pre-evaluation selector relays 156, 157, 158 and 159 are provided, respectively having operating coils 161, 162, 163 and 164 arranged for selective energization by programmer 26 through any appropriate switching system, which again can be diode matrix 100. Relays 156 through 159 are respectively provided with normally closed contacts 166, 167, 168 and 169, which serially connect the —150 volt source to control grid 102 of thyratron tube 101 of pre-evaluation firing circuit 199 through diode 171 of coincidence circuit 172; pre-evaluation firing circuit 199 is identical to evaluation firing circuit 99 and thus its component elements are indicated by like reference numerals. Relays 156 through 159 are also provided with normally closed contacts 173, 174, 175 and 176, again serially connecting the —150 volt source to control grid 102 of thyratron 101 through diode 177 of coincidence circuit 172. The normally open contacts of relays 156 through 159 are respectively connected to the pulse pick-off circuits of the respective decade dividers necessary to form the desired time intervals. Thus, normally open contacts 178 and 179 of relay 156 are respectively connected to the pulse pick off circuits of cathode number 8 of decade divider D2 and cathode number 1 of decade divider D3. It is thus seen that when relay 156 is actuated, contacts 178 and 179 are closed, thus impressing count indicating pulses from the 8th cathode of decade divider D2 and the first cathode of decade divider D3 upon the coincidence circuit 172, thus providing a pulse for firing thyratron 101 at 1.8 seconds. Likewise, normally open contacts 181 and 182 of relay 157 are respectively connected to the number 8 cathode of decade divider D2 and the number 2 cathode of decade divider D3, thus providing a pulse for firing thyratron 101 after a time interval of 2.8 seconds when relay 157 is actuated. Relay 158 has its normally open contacts 183 and 184 connected respectively to the number 8 cathode of decade divider D2 and the number 5 cathode of decade divider D3, and relay 159 has its normally open contacts 185 and 186 connected respectively to the 5th cathode of decade divider D3 and the first cathode of decade divider D4. Thus, it is seen that when relay 158 is actuated, tube 101 is fired after a time delay of 5.8 seconds, and with relay 159 actuated, tube 101 is fired after a time delay of fifteen seconds.

Figure 7:
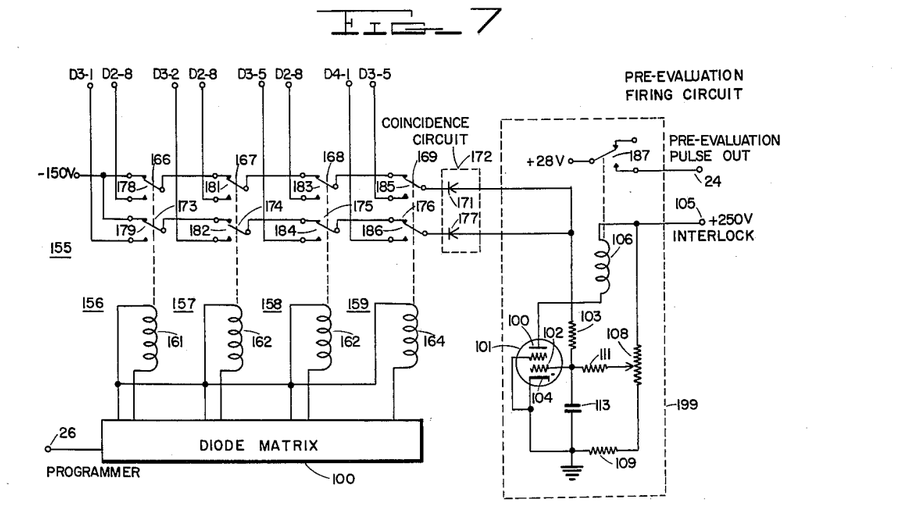
FIG. 7 is a schematic diagram showing the pre-evaluation selector circuitry of the system of FIG. 3.

As in the case of firing circuit 99, relay operating coil 106 of pre-evaluation firing circuit 199 connects the plate 109 of thyratron 101 to the positive 250 volt interlock connection 105. Operating coil 106 has normally open contact 187 associated therewith which connects the pre-evaluation pulse output circuit 24 to the positive 28 volt source of potential. Also, as in the case of evaluation firing circuit 99, once thyratron 101 of pre-evaluation firing circuit 199 has fired, it will remain conductive and operating coil 106 will remain energized, thus maintaining contacts 187 closed until the positive 250 volt interlock potential is removed by the programmer 26. As previously indicated, the components of pre-evaluation firing circuit 199 have the same values as those previously indicated for the evaluation firing circuit 99. It will be readily apparent that the choice of pre-evaluation delays can be expanded to any desired number and any time duration by the mere addition of one additional relay for each additional pre-evaluation period desired; quite obviously, if the number of pre-evaluation delays desired should approach or exceed thirty, an additional three groups of logic relays corresponding to logic relays 91, 92 and 93 associated with the evaluation pulse providing circuit could readily be employed for providing the pre-evaluation delay.

Figure 8:
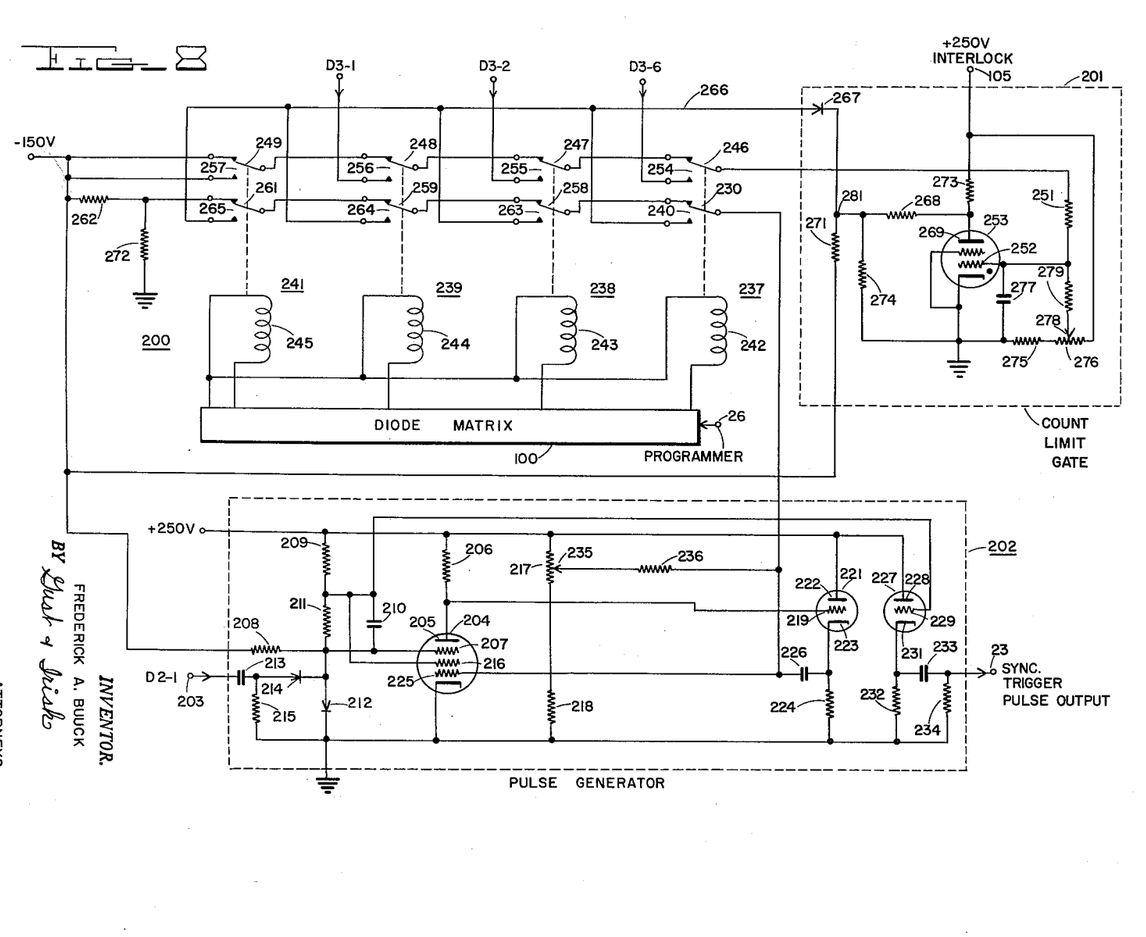
FIG. 8 is a fragmentary schematic diagram showing the synchronizing pulse providing circuitry of the system of FIG. 3.

As indicated hereinbefore, in the specific embodiment, it was desired to provide a choice of four sync trigger pulses to stimulus generator 13, i.e., a single pulse or trains of 2, 6 or continuous pulses. As also indicated hereinabove, it is desired that the PRF of the sync trigger pulses be selectively variable between ten and one pulses per second. In order to thus provide the requisite sync trigger pulses, the circuitry shown in FIG. 8 is provided which includes rate trigger selector relays 200, count limit gate circuit 201 and pulse generator 202. In the illustrated embodiment, the input circuit 203 of pulse generator 202 is connected to the number 1 cathode of decade divider D2, thus providing a pulse input to the pulse generator 202 at the rate of ten pulses per second. Pulse generator 202 comprises a pentode-type tube 204 having its plate 205 connected to the positive source of 250 volt potential by plate resistor 206. Grid 207 of tube 204 is connected to the −150 volt source of potential by grid resistor 208 and a voltage divider consisting of resistors 209 and 211 is connected between the positive 250 volt source of potential and the grid 207. Grid 207 is also connected to ground by diode 212. Input circuit 203 of pulse generator 202 is coupled to grid 207 of tube 204 by serially connected capacitor 213 and diode 214, with the midpoint therebetween being connected to ground by resistor 215. The midpoint between resistors 209 and 211 is connected to screen grid 216 of tube 204 with the cathode being grounded as shown. Another voltage divider consisting of potentiometer 217 and resistor 218 is connected between the positive source of 250 volt potential and ground as shown. Plate 205 of pentode tube 204 is connected to control grid 219 of triode 221 which has its plate 222 directly connected to the positive source of 250 volt potential and its cathode 223 connected to ground by cathode resistor 224. Cathode 223 of triode 221 is connected to grid 225 of pentode 204 by capacitor 226. An isolation amplifier stage is provided in pulse generator 202 consisting of triode 227 having its plate 228 connected to the positive source of 250 volt potential and having its control grid 229 connected to the midpoint between resistors 209 and 211. Cathode 231 of tube 227 is connected to ground by cathode resistor 232 and to sync trigger pulse output circuit 23 by coupling capacitor 233 with resistor 234 connecting output circuit 23 to ground as shown. Capacitor 210 is connected in parallel across resistor 211. Sliding element 235 of potentiometer 217 is connected to grid 225 of tube 204 by resistor 236. Grid 225 of pentode 204 is also connected to the common point of contacts 240 of relay 237 of rate trigger selector relay 200.

The circuit of pulse generator 202 will be recognized as being a phantastron circuit which is capable of a frequency dividing function in steps from one through ten in accordance with the adjustment of potentiometer 217.

Thus it is seen that pulse generator 202 can be adjusted to provide sync trigger pulses in its output circuit 23 having the same PRF as the input pulses applied to the input circuit 203, i.e., in this case ten pulses per second, and that depending upon the adjustment of potentiometer 217, the PRF of the output sync trigger pulses in output circuit 23 can selectively be adjusted as indicated below:

| Dividing action of phantastron: | PRF of output signals |
|---|---|
| 1 | 10.00 |
| 2 | 5.00 |
| 3 | 3.33 |
| 4 | 2.50 |
| 5 | 2.00 |
| 6 | 1.67 |
| 7 | 1.43 |
| 8 | 1.25 |
| 9 | 1.11 |
| 10 | 1.00 |

In order to provide the desired number of sync trigger pulses, i.e., one pulse, two pulses, six pulses, or a continuous train of pulses, as required in the specific example illustrated, rate trigger selector relays 200 are provided comprising relays 237, 238, 239, and 241, respectively having operating coils 242, 243, 244 and 245. The operating coils of relays 237 through 241 are selectively energized in response to the command of programmer 26 by any suitable switching system, such as a diode matrix 100. Relays 237 through 241 are provided with normally closed contacts 246 through 249, respectively, which serially connect the −150 volt source of potential with resistor 251 and control grid 252 of thyratron-type tube 253 of count limit gate circuit 201. Normally open contacts 254, 255 and 256 of relays 237, 238 and 239 are connected respectively to the pick-off circuits of cathode number 6 of decade divider D3, cathode number 2 of decade divider D3, and cathode number 1 of decade divider D3. Normally open contact 257 of relay 241 is connected to the −150 volt source of potential. Normally closed contacts 230, 258, 259 and 261 of relays 237, 238, 239 and 241 are respectively connected in series with resistor 262 between the −150 volt source of potential and grid 225 of pentode 204. Normally open contacts 249, 263, 264 and 265 of relays 237, 238, 239 and 241 are respectively connected to line 266 with diode 267 and resistor 268 serially connecting the same to the plate 269 of thyratron 253. Diode 267 is also connected to the −150 volt source of potential by resistor 271. Resistor 262 is also connected to ground by resistor 272, as shown.

Plate 269 of thyratron 253 is connected to the positive 250 volt interlock 105 by plate resistor 273. The midpoint between resistors 268 and 271 is connected to ground by resistor 274 and a voltage divider comprising serially connected resistor 275 and potentiometer 276 is connected between ground and the positive 250 volt interlock source 105, as shown. Control grid 252 of thyratron 253 is connected to ground by capacitor 277 with sliding element 278 of potentiometer 276 being connected to control grid 252 by resistor 279.

Relay 241 is actuated when it is desired to provide a continuous train of sync trigger pulses in the output circuit 23 of pulse generator 202. Here, in response to actuation of relay 241, opening of contact 249 and closing of contact 257 still connects the negative 150 volt source of potential to grid 252 of thyratron tube 253, the adjustment of potentiometer 276 being such as to keep the thyratron from firing under this condition. Opening of contact 261 and closing of contact 265 of relay 241 likewise connects grid 225 of pentode 204 of the phantastron circuit of pulse generator 202 to point 281 between resistors 271 and 268, the potential of this point when the thyratron 253 is not fired being normally slightly above ground, thereby permitting the phantastron circuit to operate continuously to provide the requisite sync trigger pulses in the output circuit 23. If it is desired to provide a single sync trigger pulse, relay 239 is actuated, thus closing contacts 256 and 264. This in essence connects the control grid 252 of tube 253 to the first cathode of decade divider D3 and thus after a one second interval, a pulse will be provided in the pick-off circuit associated with cathode number 1 of decade divider D3 which is coupled to control grid 252 of thyratron 253 and which causes the thyratron to fire. Firing of the thyratron 253 with the consequent increase in plate current flow lowers the potential of point 281 to about −8 volts, this potential being fed back to suppresion grid 207 of the phantastron circuit of pulse generator 202 thus cutting off tube 204 and in turn terminating the sync trigger pulses. Likewise, the sync trigger pulses can be terminated after two or six pulses responsive respectively to actuation of relays 238 or 237. It will be readily seen that the number of sync trigger pulses which can be provided can be expanded to any desired number by merely adding additional relays to the rate trigger selector relays 200 with their contacts being connected to the appropriate pick-off circuit of the appropriate decade divider.

The specific relay connections shown in FIG. 8 are for a sync trigger pulse PRF of one pulse per second. Thus, adjustment of the phantastron circuit of pulse generator 202 to provide any other PRF will necessitate appropriate changes in the connections of normally open contacts 254, 255 and 256 of relays 237, 238 and 239, respectively.

In an actual circuit constructed in accordance with FIG. 8, the following component values were employed:

| | | |
|---|---|---|
| Pentode 204 | | 5725 |
| Resistor 206 | megohm | 1 |
| Resistor 208 | ohms | 130,000 |
| Resistor 209 | do | 39,000 |
| Capacitor 210 | microfarad | .0022 |
| Resistor 211 | ohms | 56,000 |
| Diode 212 | | 1N38A |
| Capacitor 213 | microfarads | 1,000 |
| Diode 214 | | 1N38A |
| Resistor 215 | megohm | 1 |
| Potentiometer 217 | ohms | 100,000 |
| Resistor 218 | do | 5,100 |
| Triodes 221, 227 | | 5814 |
| Resistor 224 | ohms | 100,000 |
| Capacitor 226 | microfarad | 0.1 |
| Resistor 232 | ohms | 100,000 |
| Capacitor 233 | microfarad | .001 |
| Resistor 234 | ohms | 100,000 |
| Resistor 236 | megohms | 1.8 |
| Resistor 251 | do | 1.3 |
| Thyratron 253 | | 2D21 |
| Resistor 262 | ohms | 120,000 |
| Diode 267 | | 1N463 |
| Resistor 268 | megohm | 1 |
| Resistor 271 | ohms | 910,000 |
| Resistor 272 | do | 8,200 |
| Resistor 273 | do | 100,000 |
| Resistor 274 | do | 91,000 |
| Resistor 275 | do | 200,000 |
| Potentiometer 276 | do | 50,000 |
| Capacitor 277 | microfarad | 0.1 |
| Resistor 279 | megohms | 2.4 |

It will now be readily apparent that I have provided an automatic testing system for complex apparatus, and particularly an improved timer therefor in which three timing functions are provided, i.e., sync trigger pulses, pre-evaluation pulses, and evaluation or enabling pulses, the system being characterized by its great flexibility in the duration of available time intervals.

While I have described above the principles of my invention in connection with specific apparatus, it is to be clearly understood that this description is made only by way of example and not as a limitation to the scope of my invention.

What is claimed is:

1. An automatic testing system comprising: stimulus generator means adapted to be connected to the apparatus being tested for supplying a predetermined test stimulus thereto responsive to a sychronizing signal and having a synchronizing signal input circuit; evaluator means adapted to be connected to said apparatus for evaluating the response thereof to said stimulus responsive to an enabling signal and having an enabling signal input circuit; and a timing system for supplying said synchronizing and enabling signals and for providing a predetermined time interval therebetween, said timing system comprising a source of electrical input pulses having a predetermined repetition frequency, a plurality of successively higher order ten stable state instantaneous resetting pulse counting devices each having a plurality of pulse-count indicating pick-off circuits, each of said pick-off circuits having means for providing a count indicating pulse, said devices being coupled in cascade to said pulse source whereby said devices count-down said input pulses, first output circuit means coupled to said stimulus generator means synchronizing signal input circuit for supplying synchronizing pulses thereto, said first output circuit means being coupled to said pulse source whereby synchronizing pulses are provided responsive to said input pulses, second output circuit means coupled to said evaluator means enabling signal input circuit for supplying an enabling pulse thereto, means for coupling said second output circuit to at least one of said pick-off circuits whereby an enabling pulse is provided responsive to the respective count-indicating pulse, and means coupling said second output circuit and all of said counting devices for terminating the pulse counting thereby and for resetting all of said devices to zero responsive to an enabling pulse.

2. An automatic testing system comprising: stimulus generator means adapted to be connected to the apparatus being tested for supplying a predetermined test stimulus thereto responsive to a synchronizing signal and having a synchronizing signal input circuit; evaluator means adapted to be connected to said apparatus for evaluating the response thereof to said stimulus responsive to an enabling signal and having an enabling signal input circuit; and a timing system for supplying said synchronizing and enabling signals and for providing a predetermined time interval therebetween, said timing systems comprising a source of electrical input pulses having a predetermined repetition frequency, a plurality of successively higher order ten stable state instantaneous resetting pulse counting devices each having a plurality of pulse-count indicating pick-off circuits, each of said pick-off circuits having means for providing a count indicating pulse, said devices being coupled in cascade to said pulse source whereby said devices count-down said input pulses, first output circuit means coupled to said stimulus generator means synchronizing signal input circuit for supplying synchronizing pulses thereto, said first output circuit means being coupled to said pulse source whereby synchronizing pulses are provided responsive to said input pulses, gating means coupling said first output circuit means and one of said pick-off circuits for terminating said synchronizing pulses responsive to the respective count indicating pulse, second output circuit means coupled to said evaluator means enabling signal input circuit for supplying an enabling pulse thereto, means for coupling said second output circuit to at least one of said pick-off circuits whereby an enabling pulse is provided responsive to the respective count-indicating pulse, and means coupling said second output circuit and all of said counting devices for terminating the pulse counting thereby and for resetting all of said devices to zero responsive to an enabling pulse.

3. An automatic testing system comprising: stimulus generator means adapted to be connected to the apparatus being tested for supplying a predetermined test stimulus thereto responsive to a synchronizing signal and having a synchronizing signal input circuit; evaluator means adapted to be connected to said apparatus for evaluating the response thereof to said stimulus responsive to an enabling signal and having an enabling signal input circuit; and a timing system for supplying said synchronizing and enabling signals and for providing a predetermined time interval therebetween, said timing system comprising a source of electrical input pulses having a predetermined repetition frequency, a plurality of successively higher order ten stable state instantaneous resetting pulse counting devices each having a plurality of pulse-count indicating pick-off circuits, each of said pick-off circuits having means for providing a count indicating pulse, said devices being coupled in cascade to said pulse source whereby said devices count-down said input pulses, first output circuit means coupled to said stimulus generator means synchronizing signal input circuit for supplying synchronizing pulses thereto, said first output circuit means being coupled to said pulse source whereby synchronizing pulses are provided responsive to said input pulses, gating circuit means coupled to said first output circuit means for terminating said synchronizing pulses responsive to a gating pulse, first switching means for selectively coupling said gating circuit means to said pick-off circuits whereby a gating pulse is provided responsive to a respective count indicating pulse, second output circuit means coupled to said evaluator means enabling signal input circuit for supplying an enabling pulse thereto, second switching means for selectively coupling said second output circuit to said pick-off circuits whereby an enabling pulse is provided responsive to the respective count indicating pulse, and means coupling said second output circuit and said counting devices for terminating the pulse counting thereby and for resetting all of said devices to zero responsive to an enabling pulse.

4. An automatic testing system comprising: stimulus generator means adapted to be connected to the apparatus being tested for supplying a predetermined test stimulus thereto responsive to a synchronizing signal and having a synchronizing signal input circuit; evaluator means adapted to be connected to said apparatus for evaluating the response thereof to said stimulus, said evaluator means being adapted to initiate an evaluation responsive to a pre-evaluation signal and to provide an indication of the result of the evaluation responsive to an enabling signal and having pre-evaluation and enabling signal input circuits; and a timing system for supplying said synchronizing and enabling signals and for providing a predetermined time interval therebetween, said timing system comprising a source of electrical input pulses having a predetermined repetition frequency, a plurality of successively higher order ten stable state instantaneous resetting pulse counting devices each having a plurality of pulse-count indicating pick-off circuits, each of said pick-off circuits having means for providing a count indicating pulse, said devices being coupled in cascade to said pulse source whereby said devices count-down said input pulses, first output circuit means coupled to said stimulus generator means synchronizing signal input circuit for supplying synchronizing pulses thereto, said first output circuit means being coupled to said pulse source whereby synchronizing pulses are provided responsive to said input pulses, second output means coupled to said evaluator means pre-evaluation signal input circuit for supplying a pre-evaluation pulse thereto, means for coupling said second output circuit to at least one of said pick-off circuits whereby a pre-evaluation pulse is provided responsive to the respective count-indicating pulse, third output circuit means coupled to said evaluator means enabling signal input circuit for supplying an enabling pulse thereto, means for coupling said third output circuit to at least one other pick-off circuit which is of a higher order than said one pick-off circuit whereby an enabling pulse is provided responsive to the respective count-indicating pulse, and means coupling said third output circuit and said counting devices for terminating the pulse counting thereby and for resetting all of said devices to zero responsive to an enabling pulse.

5. An automatic testing system comprising: stimulus generator means adapted to be connected to the apparatus being tested for supplying a predetermined test stimulus thereto responsive to a synchronizing signal and having a synchronizing signal input circuit; evaluator means adapted to be connected to said apparatus for evaluating the response thereof to said stimulus responsive to an enabling signal and having an enabling signal input circuit; and a timing system for supplying said synchronizing and enabling signals and for providing a predetermined time interval therebetween, said timing system comprising a source of electrical input pulses having a predetermined repetition frequency, at least one ten stable state instantaneous resetting pulse counting device coupled to said pulse source whereby said device counts-down said input pulses, a plurality of additional successively higher order ten stable state instantaneous resetting pulse counting devices each having a plurality of pulse-count indicating pick-off circuits, each of said pick-off circuits having means for providing a count indicating pulse, said additional devices being coupled in cascade to said one device whereby said additional devices continue to count-down said input pulses, first output circuit means coupled to said stimulus generator means synchronizing signal input circuit for supplying synchronizing pulses thereto and including selectively variable frequency dividing means, said first output circuit means being coupled to said one pulse counting device whereby synchronizing pulses are provided responsive to the pulses provided thereby, gating means coupled to said first output circuit means for terminating said synchronizing pulses responsive to a gating pulse, said gating means being coupled to one of said pick-off circuits whereby a gating pulse is provided response to a respective count indicating pulse, second output circuit means coupled to said evaluator means enabling signal input circuit for supplying an enabling pulse thereto, means for coupling said second output circuit to at least one of said pick-off circuits whereby an enabling pulse is provided responsive to the respective count-indicating pulse, and means coupling said second output circuit and all of said counting devices for terminating the pulse counting thereby and for resetting all of said devices to zero responsive to an enabling pulse.

6. An automatic testing system comprising: stimulus generator means adapted to be connected to the apparatus being tested for supplying a predetermined test stimulus thereto responsive to a synchronizing signal and having a synchronizing signal input circuit; evaluator means adapted to be connected to said apparatus for evaluating the response thereof to said stimulus responsive to an enabling signal and having an enabling signal input circuit; and a timing system for supplying said synchronizing and enabling signals and providing a predetermined time interval therebetween, said timing system comprising a source of electrical input pulses having a predetermined repetition frequency, a plurality of successively higher order ten stable state glow transfer tubes each having ten cathodes respectively connected to pulse-count indicating pick-off circuits, each of said pick-off circuits having means for providing a count indicating pulse, said tubes being connected in cascade to said pulse source whereby said tubes count-down said input pulses, first output circuit means coupled to said stimulus generator means synchronizing signal input circuit for supplying synchronizing pulses thereto, said first output circuit being coupled to said pulse source whereby synchronizing pulses are provided responsive to said input pulses, second output circuit means coupled to said evaluator means enabling signal input circuit for supplying an enabling pulse thereto, means for coupling said second output circuit to at least one of said pick-off circuits whereby an enabling pulse is provided responsive to the respective count-indicating pulse, a resetting circuit coupling said second output circuit to all except one of the cathodes of each of said tubes for impressing a predetermined potential thereon to terminate said counting by said tubes and to reset all of said tubes to zero responsive to an enabling pulse, and a circuit coupled to said resetting circuit for selectively removing said potential from said cathodes thereby causing said tubes to resume counting-down of said input pulses to initiate a new timing interval.

7. For use in automatic testing apparatus, a timing system comprising: a source of electrical input pulses having a predetermined repetition frequency; a plurality of successively higher order ten stable state glow transfer tubes each having ten cathodes respectively connected to pulse count indicating pick-off circuits, each of said pick-off circuits having means for providing a count indicating pulse, said tubes being connected in cascade to said pulse source whereby said tubes count-down said input pulses; first pulse generator means having an input circuit coupled to said pulse source and having an output circuit for providing synchronizing pulses responsive to said input pulses; a plurality of groups of ten logic relays corresponding to the number of said tubes, the contacts of the relays of each group being respectively connected to the pick-off circuits of a respective tube; switching means coupled to said relays for selectively actuating one relay in each group thereby providing a pre-selected count indicating pulse from each tube; second pulse generating means having input and output circuits; a coincidence circuit coupling said second pulse generating means input circuit to the contacts of the relays of each of said groups thereby impressing on said second pulse generator a pulse responsive to the pulse count selected by said logic relays whereby a timing pulse is provided in said second pulse generating means output circuit responsive to said pulse count; and a resetting circuit coupling said second pulse generator means and said tubes for terminating the pulse counting thereof and for resetting all of said tubes to zero responsive to a timing pulse.

8. For use in automatic testing apparatus, a timing system comprising: a source of electrical input pulses having a predetermined repetition frequency; a plurality of successively higher order ten stable state glow transfer tubes each having ten cathodes respectively connected to pulse count indicating pick-off circuits, each of said pick-off circuits having means for providing a count indicating pulse, said tubes being connected in cascade to said pulse source whereby said tubes count-down said input pulses; first pulse generator means having an input circuit coupled to said pulse source and having an output circuit for providing synchronizing pulses responsive to said input pulses; a gating circuit coupled to said first pulse generating means for terminating said synchronizing pulses responsive to a gating pulse; a plurality of relays having contacts respectively connected to predetermined ones of said pick-off circuits and to said gating circuit; switching means coupled to said relays for selectively actuating the same thereby providing a gating pulse responsive to the selected pulse count; a plurality of groups of ten logic relays corresponding to the number of said tubes, the contacts of each group of said logic relays being respectively connected to the pick-off circuits of a respective tube, said switching means being coupled to said logic relays for selectively actuating one relay in each group thereby providing a preselected count-indicating pulse from each tube; second pulse generating means having input and output circuits; a coincidence circuit coupling said second pulse generating means input circuit to the contacts of the relays of each of said groups thereby impressing on said second pulse generator a pulse responsive to the pulse count selected by said logic relays whereby a timing pulse is provided in said second pulse generating means output circuit responsive to said pulse count; and a resetting circuit coupling said second pulse generator means and said tubes for terminating the pulse counting thereof and for resetting all of said tubes to zero responsive to a timing pulse.

9. For use in automatic testing apparatus, a timing system comprising: a source of electrical input pulses having a predetermined repetition frequency; a plurality of successively higher order ten stable state glow transfer tubes each having ten cathodes respectively connected to pulse count indicating pick-off circuits, each of said pick-off circuits having means for providing a count indicating pulse, said tubes being connected in cascade to said pulse source whereby said tubes count-down said input pulses; first pulse generator means having an input circuit coupled to said pulse source and having an output circuit for providing synchronizing pulses responsive to said input pulses; second pulse generator means having input and output circuits; a plurality of relays having contacts respectively connected to predetermined ones of said pick-off circuits, switching means coupled to said relays for selectively actuating one or more of the same thereby providing first preselected count indicating pulses; a first coincidence circuit coupling said second pulse generating means input circuit to the contacts of said relays thereby impressing on said second pulse generator a pulse responsive to the first pulse count selected by said switching means whereby a first timing pulse is provided in said second pulse generating means output circuit; a plurality of groups of ten logic relays corresponding to the number of said tubes, the contacts of the relays of each group being respectively connected to the pick-off circuits of a respective tube; said switching means being coupled to said logic relays for selectively actuating one relay in each group thereby providing a preselected count indicating pulse from each tube; third pulse generating means having input and output circuits; a second coincidence circuit coupling said third pulse generating means input circuit to the contacts of the relays of each of said groups thereby impressing on said third pulse generator a pulse responsive to the pulse count selected by said logic relays whereby a second timing pulse is provided in said third pulse generating means output circuit; and a resetting circuit coupling said third pulse generator means and said tubes for terminating the pulse counting thereby and for resetting all of said tubes responsive to a second timing pulse.

10. For use in automatic testing apparatus, a timing system comprising: a source of electrical input pulses having a predetermined repetition frequency; a first ten stable state glow transfer tube connected to said pulse source for counting-down said input pulses; a plurality of additional successively higher order ten stable state glow transfer tubes each having ten cathodes respectively connected to pulse count indicating pick-off circuits, each of said pick-off circuits having means for providing a count indicating pulse, said additional tubes being connected in cascade to said first tube whereby said additional tubes further count-down said input pulses; first pulse generator means including selectively variable frequency divider means with an input circuit coupled to said first tube and having an output circuit for providing synchronizing pulses responsive to the pulses provided by said first tube; a gating circuit coupled to said first pulse generating means for terminating said synchronizing pulses responsive to a gating pulse; a plurality of relays having contacts respectively connected to predetermined ones of said pick-off circuits and to said gating circuit; switching means coupled to said relays for selectively actuating the same thereby providing a gating pulse responsive to the selected pulse count; a plurality of groups of ten logic relays corresponding to the number of said additional tubes, the contacts of each group of said logic relays being respectively connected to the pick-off circuits of a respective tube, said switching means being coupled to said logic relays for selectively actuating one relay in each group thereby providing a preselected count-indicating pulse from each tube; second pulse generating means having input and output circuits; a coincidence circuit coupling said second pulse generating means input circuit to the contacts of the relays of each of said groups thereby impressing on said second pulse generator a pulse responsive to the pulse count selected by said logic relays whereby a timing pulse is provided in said second pulse generating means output circuit responsive to said pulse count; and a resetting circuit coupling said second pulse generator means and said tubes for terminating the pulse counting thereof and for resetting all of said tubes to zero responsive to a timing pulse.

References Cited in the file of this patent

UNITED STATES PATENTS

| | | |
|---|---|---|
| 2,608,674 | Depp | Aug. 26, 1952 |
| 2,664,555 | Thomas et al. | Dec. 29, 1953 |
| 2,696,572 | Schmid | Dec. 7, 1954 |
| 2,810,099 | Townsend et al. | Oct. 15, 1957 |
| 2,860,286 | Ost | Nov. 11, 1958 |
| 2,871,399 | Scuitto | Jan. 27, 1959 |
| 2,872,110 | Snyder et al. | Feb. 3, 1959 |
| 2,922,950 | Douglass et al. | Jan. 26, 1960 |
| 2,950,437 | Stahl | Aug. 23, 1960 |
| 2,957,133 | Burkhart | Oct. 18, 1960 |
| 2,961,488 | Cameron et al. | Nov. 22, 1960 |
| 2,963,652 | Taylor et al. | Dec. 6, 1960 |

OTHER REFERENCES

Automatic Circuit Tester, article in Electronics, Oct. 1954, pages 136–139.

Go, No-Go, Gage Checks Out Bomarc Automatically, article in Electronics, Engineering Edition, July 4, 1958, pages 43–45.